United States Patent [19]

Lassanske

[11] Patent Number: 4,934,350
[45] Date of Patent: Jun. 19, 1990

[54] METHOD TO PREVENT PISTON RING ROTATION

[75] Inventor: George G. Lassanske, Oconomowoc, Wis.

[73] Assignee: Outboard Marine Corporation, Waukegan, Ill.

[21] Appl. No.: 296,012

[22] Filed: Jan. 12, 1989

[51] Int. Cl.⁵ .............................................. F02F 11/00
[52] U.S. Cl. .............................. 123/193 P; 92/165 PR
[58] Field of Search ............... 123/193 P; 92/165 PR, 92/177, 233; 277/217

[56] References Cited

U.S. PATENT DOCUMENTS

| | | |
|---|---|---|
| 1,363,725 | 12/1920 | Flammang . |
| 1,406,475 | 2/1922 | Morgal ................................ 277/217 |
| 1,514,022 | 11/1924 | Smith . |
| 1,526,309 | 2/1925 | Hof . |
| 2,428,177 | 9/1947 | Phillips . |
| 2,955,579 | 10/1960 | Block . |
| 3,379,186 | 4/1968 | Yost . |
| 3,554,564 | 1/1971 | Lassanske . |
| 4,256,067 | 3/1981 | Fukui . |
| 4,256,068 | 3/1981 | Irimajiri et al. . |
| 4,286,501 | 9/1981 | Thomas et al. . |
| 4,367,702 | 1/1983 | Lassanske . |
| 4,383,508 | 5/1983 | Irimajiri et al. . |
| 4,384,554 | 5/1983 | Gotoda .............................. 277/217 |
| 4,471,730 | 9/1984 | Honda . |
| 4,474,144 | 10/1984 | Tanaka et al. . |
| 4,502,434 | 3/1985 | Irimajiri et al. . |
| 4,570,945 | 2/1986 | Hayashi ................................ 92/177 |
| 4,671,228 | 6/1987 | Tomita et al. . |
| 4,831,919 | 5/1989 | Bruni .............................. 123/193 P |

FOREIGN PATENT DOCUMENTS

| | | |
|---|---|---|
| 0017848 | of 1929 | Australia . |
| 1156722 | 5/1958 | France . |
| 0441224 | 1/1936 | United Kingdom . |

Primary Examiner—Willis R. Wolfe
Assistant Examiner—M. Macy
Attorney, Agent, or Firm—Michael, Best & Friedrich

[57] ABSTRACT

An internal combustion engine is provided having a generally cylindrical piston, a piston ring on the generally cylindrical piston, and a cylinder receiving therein the piston for reciprocation with the piston ring. The piston ring and the cylinder are configured in such a fashion that rotation of the piston ring relative to the cylinder is prevented.

22 Claims, 1 Drawing Sheet

METHOD TO PREVENT PISTON RING ROTATION

BACKGROUND OF THE INVENTION

The invention relates to internal combustion engines, and more particularly, to internal combustion engine piston ring constructions.

It is common practice in the design of internal combustion engines to install a pin in an engine piston to prevent rotation of a piston ring mounted on the piston, relative to the piston. Piston rings have opposite ends spaced apart to form a gap which allows mounting of the piston rings on pistons. The pins are provided in the pistons of prior art internal combustion engines to prevent the piston rings from rotating to a position where they can deflect into intake or exhaust ports of the internal combustion engine, especially when the engine is a high performance engine having large intake or exhaust ports.

The practice of installing a pin in a piston for preventing rotation of a piston ring is costly as is the associated practice of forming a notch in the piston ring, to accept the pin, in such a fashion that a reasonably small piston ring can be produced having a minimal gap between the spaced apart opposite ends, when the piston ring is mounted on the piston. In addition to being costly, these practices have been known to reduce total engine reliability.

Attention is directed to the following U.S. patent references:

| Flammang | 1,363,725 | December 28, 1920 |
| Smith | 1,514,022 | November 4, 1924 |
| Hof | 1,526,309 | February 10, 1925 |
| Phillips | 2,428,177 | September 30, 1947 |
| Block | 2,955,579 | October 11, 1960 |
| Yost | 3,379,186 | April 23, 1968 |
| Lassanske | 3,554,564 | January 12, 1971 |
| Fukui | 4,256,067 | March 17, 1981 |
| Irimajiri et al. | 4,256,068 | March 17, 1981 |
| Thomas et al. | 4,286,501 | September 1, 1981 |
| Lassanske | 4,367,702 | January 11, 1983 |
| Irimajiri et al. | 4,383,508 | May 17, 1983 |
| Honda | 4,471,730 | September 18, 1984 |
| Tanaka et al. | 4,474,144 | October 2, 1984 |
| Irimajiri et al. | 4,502,434 | March 5, 1985 |
| Tomita et al. | 4,671,228 | June 9, 1987 |

Attention is also directed to U.S. Winston patent application No. 035,596, and to the following foreign references:

| Dawson | Australia | 17,848/29 | January 14, 1929 |
| Bonfa | Great Britain | 441,224 | January 15, 1936 |
| Levesque | France | 1,156,722 | May 20, 1958 |

SUMMARY OF THE INVENTION

The invention provides a piston ring for use with a generally cylindrical piston adapted to reciprocate in a cylinder having a generally elliptical cross sectional shape, the piston ring having a generally elliptical outer periphery corresponding in shape with the cross sectional shape of the generally elliptical cylinder for sliding contact with the cylinder, and the piston ring having a generally circular inner periphery.

The invention also provides an internal combustion engine comprising a generally cylindrical piston, a piston ring on the generally cylindrical piston, a cylinder receiving therein the piston for reciprocation with the piston ring, and means on the piston ring and on the cylinder for preventing rotation of the piston ring relative to the cylinder.

The invention also provides an internal combustion engine comprising a generally cylindrical piston, a piston ring on the generally cylindrical piston and including an outer periphery of generally elliptical shape, and a cylinder receiving the piston for reciprocation therein with the piston ring and having a generally elliptical cross-sectional shape corresponding in ellipticity with the outer periphery.

Other features and advantages of the invention will become apparent upon review of the following Detailed Description of the Preferred Embodiment of the Invention, reference being made to the attached drawings.

Figure 1:
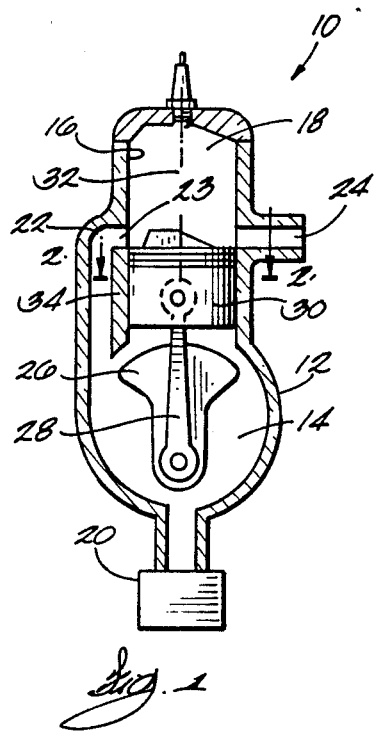
FIG. 1 is a broken away view of an internal combustion engine embodying the invention.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE PREFERRED EMBODIMENT

An internal combustion engine 10 embodying the invention is illustrated in FIG. 1. In the illustrated construction, the engine 10 is a conventional two-cycle engine, although the invention is also applicable to four-cycle engines.

The engine 10 comprises an engine block 12 including a crankcase chamber 14, and an inner surface 16 defining a cylinder bore 18. The engine 10 also comprises a carburetor 20 communicating with the crankcase chamber 14, and a transfer or intake passage 22 communicating between the crankcase chamber 14 and the cylinder bore 18. The transfer passage 22 communicates with the cylinder bore 18 via an intake port 23. The engine 10 also comprises an exhaust passage 24 communicating with the cylinder bore 18 via an exhaust port 25. The engine 10 further comprises a crankshaft 26 rotatably mounted in the crankcase chamber 14, a connecting rod 28 pivotally connected to the crankshaft 26, and a piston 30 pivotally connected to the connecting rod 28.

The piston 30 is reciprocally movable along an axis 32 and includes a generally cylindrical outer surface 34 facing the inner surface 16 of the cylinder bore 18 and having therein (see FIGS. 2 and 3) a circumferentially extending groove 36.

Figure 2:
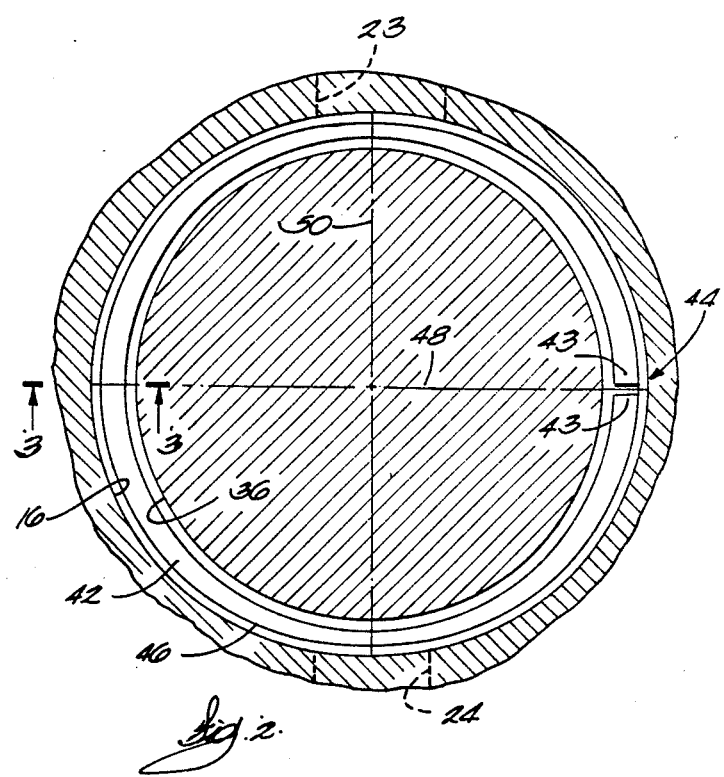
FIG. 2 is a sectional view taken along line 2—2 of FIG. 1.
Figure 3:
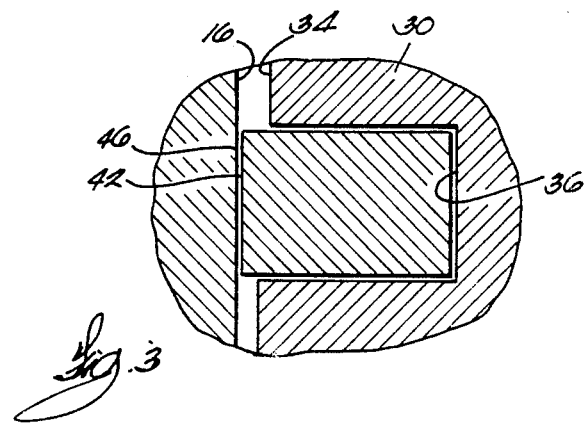
FIG. 3 is a sectional view taken along line 3—3 of FIG. 2.

As shown in FIG. 2, a piston ring 42 is located or mounted in the groove 36 in the piston 30. Preferably, the piston ring 42 is made of powdered metal. The piston ring 42 has opposite ends 43 spaced apart to form a gap 44 and includes an outer periphery 46 facing the cylinder bore inner surface 16.

The piston ring 42 and the cylinder bore inner surface 16 include interengaging means for preventing rotation of the piston ring 42 relative to the cylinder bore inner surface 16 and about axis 32. These means include providing the cylinder bore inner surface 16 with a non-circular cross-sectional shape, and providing the piston ring outer periphery 46 with a corresponding non-circular shape. In the preferred embodiment of the invention, the cylinder bore inner surface 16 is provided with an elliptical shape having a major axis 48 and a minor axis 50 and the piston ring outer periphery 46 is provided with a corresponding elliptical shape.

The location of the major axis 48 of the cylinder bore about the axis 32 and relative to the intake port 23 and the exhaust port 25 determines the location of the piston ring 42 about the axis 32 and relative to the intake port 23 and the exhaust port 25. The angular location of the major axis 48 of the cylinder bore inner surface 16 about the axis 32 and the angular location of the gap 44 in the piston ring 42 about the axis 32, and relative to the intake port 23 and the exhaust port 25, are selected such that the gap 44 of the piston ring 42 is not aligned with any of the ports communicating with the cylinder bore 18, thereby preventing the ends 43 of the piston ring 42 from extending outwardly into a port and being broken off.

The major axis 48 of the cylinder bore inner surface 16 is greater than the minor axis 50 of the cylinder bore inner surface 16 by a minimum amount required to prevent rotation of piston ring 42 about the axis 32 and relative to the cylinder bore inner surface 16. In the preferred embodiment of the invention, the major axis 48 is greater than the minor axis 50 by less than 10%. More specifically, the major axis 48 is greater than the minor axis 50 by about 1%.

Various of the features of the invention are set forth in the following claims.

I claim:

1. An internal combustion engine comprising a essentially cylindrical piston, a piston ring on said piston, a cylinder receiving said piston for reciprocation therein with said piston ring, and means on said piston ring and on said cylinder for preventing rotation of said piston ring relative to said cylinder.

2. An internal combustion engine in accordance with claim 1 wherein said piston ring includes an outer periphery and wherein said means for preventing rotation of said piston ring relative to said cylinder comprises said outer periphery being of non-circular shape and said cylinder being of corresponding non-circular cross-sectional shape.

3. An internal combustion engine in accordance with claim 2 wherein said outer periphery is generally elliptical.

4. An internal combustion engine in accordance with claim 3 wherein said generally elliptical outer periphery has a major axis and a minor axis, the major axis being greater than the minor axis by an amount approximating a minimum amount required to prevent rotation of said piston ring relative to said cylinder.

5. An internal combustion engine in accordance with claim 3 wherein said generally elliptical outer periphery has a major axis and a minor axis, the major axis being greater than the minor axis by less than 10%.

6. An internal combustion engine comprising a generally cylindrical piston, a piston ring including a generally elliptical outer periphery and being supported on said generally cylindrical piston, a cylinder receiving said piston for reciprocation therein with said piston ring, and means on said piston ring and on said cylinder for preventing rotation of said piston ring relative to said cylinder, said means for preventing rotation of said piston ring relative to said cylinder comprising said outer periphery being of non-circular shape and said cylinder being of corresponding non-circular cross-sectional shape, said outer periphery having a major axis and a minor axis, the major axis being greater than the minor axis by less than 10%.

7. An internal combustion engine in accordance with claim 6 wherein said the major axis is greater than the minor axis by 1%.

8. An internal combustion engine in accordance with claim 7 wherein said internal combustion engine is a two stroke engine.

9. An internal combustion engine comprising an essentially cylindrical piston, a piston ring on said piston and including an outer periphery of generally elliptical shaped, and a cylinder receiving said piston for reciprocation therein with said piston ring and having a generally elliptical cross-sectional shape corresponding in ellipticity with said outer periphery of said piston ring.

10. An internal combustion engine in accordance with claim 8 wherein said generally elliptical outer periphery has a major axis and a minor axis, the major axis the major axis being greater than the minor axis by less than an amount approximating a minimum amount required to prevent rotation of said piston ring relative to said cylinder.

11. An internal combustion engine in accordance with claim 9 wherein said generally elliptical outer periphery has a major axis and a minor axis, the major axis being greater than the minor axis less than 10%.

12. An internal combustion engine in accordance with claim 9 wherein said internal combustion engine is a two stroke engine.

13. A piston ring for use with a generally cylindrical piston adapted to reciprocate in a cylinder having a generally elliptical cross sectional shape, said piston ring having a generally elliptical outer periphery corresponding in shape with the cross sectional shape of the generally elliptical cylinder for sliding contact with the cylinder, and said piston ring having a generally circular inner periphery.

14. A piston ring in accordance with claim 13 wherein the generally elliptical piston ring has a major axis and a minor axis, the major axis being larger than the minor axis by an amount approximating a minimum amount required to prevent rotation of the piston ring about the generally cylindrical piston within the generally elliptical cylinder.

15. A piston ring in accordance with claim 14 wherein the major axis is larger than the minor axis by less than 10%.

16. A piston ring in accordance with claim 14 wherein the major axis is larger than the minor axis by approximately 1%.

17. A piston ring in accordance with claim 14 wherein the generally cylindrical piston is adapted for use in an internal combustion engine.

18. A piston ring in accordance with claim 17 wherein the internal combustion engine is a two stroke engine.

19. An internal combustion engine comprising a generally cylindrical piston, a piston ring including a generally elliptical outer periphery and being supported on said generally cylindrical piston, a cylinder receiving said piston for reciprocation therein with said piston ring, and means on said piston ring and on said cylinder for preventing rotation of said piston ring relative to said cylinder, said means for preventing rotation of said piston ring relative to said cylinder comprising said outer periphery being of non-circular shape and said cylinder being of corresponding non-circular cross-sectional shape, said outer periphery having a major axis and a minor axis, the major axis being greater than the minor axis by an amount approximating a minimum amount required to prevent rotation of said piston ring relative to said cylinder.

20. An internal combustion engine comprising a generally cylindrical piston, a piston ring on said generally cylindrical piston and including an outer periphery of generally elliptical shape, and a cylinder receiving said piston for reciprocation therein said piston ring and having a generally elliptical cross-sectional shape corresponding in ellipicity with said outer periphery of said piston ring, said generally elliptical outer periphery having a major axis and a minor axis, the major axis being greater than the minor axis by an amount approximating a minimum amount required to prevent rotation of said piston ring relative to said cylinder.

21. An internal combustion engine comprising a generally cylindrical piston, a piston ring on said generally cylindrical piston and including an outer periphery of generally elliptical shape, and a cylinder receiving said piston for reciprocation therein with said piston ring and having a generally elliptical cross-sectional shape corresponding in ellipitcity with said outer periphery of said piston ring, said generally elliptical outer periphery having a major axis and a minor axis, the major axis being greater than the minor axis by less than 10%.

22. An internal combustion engine in accordance with claim 21 wherein the major axis is greater than the minor axis by 1%.

* * * * *